United States Patent Office 2,975,100
Patented Mar. 14, 1961

2,975,100

E. HISTOLYTICA DIAGNOSTIC ANTIGEN AND PRODUCTION THEREOF

Jeanne C. Moan, Drexel Hill, Pa., assignor to Mobac Laboratories, Inc., Drexel Hill, Pa., a corporation of Pennsylvania No Drawing. Filed Nov. 1, 1954, Ser. No. 466,231

9 Claims. (Cl. 167—84.5)

This invention relates to an antigen and the process of preparing the same. It is more particularly directed to an *Endamoeba histolytica* antigen useful in diagnosis of amebiasis by serological tests and to the process of preparing that antigen. This application is a continuation-in-part of my applications Serial Nos. 225,921 and 273,777, respectively filed May 11, 1951 and February 27, 1952, both now abandoned.

It is an object of this invention to produce an *Endamoeba histolytica* antigen which is of adequate strength and neither anticomplementary nor hemolytic. It is a further object to provide an antigen suitable for use in routine laboratory techniques to determine conclusively the presence or absence of *Endamoeba histolytica*, which is the pathogenic organism responsible for amoebic dysentery or amebiasis. Another object is to provide methods whereby such antigen may be produced. Other objects of the invention will be evident from the following description. It is a further object of this invention to provide methods for propagating *Endamoeba histolytica* in nutrient media, irrespective of the purposes for which such propagation is conducted.

The invention accordingly comprises the several steps and the relation of one or more of such steps with respect to each of the others thereof, which will be exemplified in the process hereinafter disclosed, and the scope of the invention will be indicated in the claims. The invention also comprises product possessing novel features and properties.

Prior attempts at development of serological tests for laboratory diagnosis of amebiasis have proved of little practical value because of unsuitability of the antigenic material for employment according to serological procedures. Thus, in complement fixation type of serological test, such prior antigens, due to their anticomplementary nature, are prone to give false positives and, due to their hemolytic nature are prone to give false negatives. Moreover, such antigens were so weak as to give inconclusive results. Therefore the results tended to be inconclusive and undependable. Furthermore, such tests previously proposed required serologists of such a high degree of training that individuals so highly trained were not normally available to the ordinary diagnostic laboratory.

The inconclusive and undependable tendencies of previously proposed serological tests for presence of *Endamoeba histolytica* and the exceedingly high degree of training required for carrying them out, precluded their common acceptance as a diagnostic procedure. As a practical matter, positive diagnosis by laboratory procedures of amebiasis has been possible only through the search for and discovery of *Endamoeba histolytica* by microscopic examination of stool specimens. This technique is time consuming, unpleasant, expensive for the patient, and inconclusive, since the chance of missing the parasite is large even though repeated tests are made. For this reason, few physicians have depended on laboratory reports of the presence or absence of *Endamoeba histolytica* in stool specimens, especially since *Endamoeba histolytica* and non-pathogenic amoebae are easily confused, unless a highly skilled technician can make the determination under strictly controlled conditions.

The antigen of the present invention enables ready conclusive and dependable determination by the average laboratory technician of the presence or absence of *Endamoeba histolytica* in the subject tested by relatively simple serological procedures. There is thus provided a simple test for laboratory diagnosis of amebiasis which is effective and conclusive irrespective of the presence or absence of clinical symptoms of amebiasis, which affords a means for diagnosis of amebiasis not heretofore available. Effectiveness of the antigen of the present invention when employed in serological procedures for diagnosis of amebiasis is due in part to the fact that it is of adequate strength and is neither anticomplementary nor hemolytic. The antigen of this invention is non-anticomplementary even in high concentrations; it has substantially no anticomplementary titer. It is of such antigenic strength that substantial dilution is required to enable its employment in complement fixation and other serological tests.

The antigen of the present invention is prepared by incubating *Endamoeba histolytica* under conditions conducive to its growth and antigenic effectiveness in a nutrient liquid, separating the amoebae from the nutrient liquid, rupturing the separated amoebae and recovering the resulting antigen solution from the ruptured cells. The separated liquid constitutes the antigen which is of adequate strength and is neither anticomplementary nor hemolytic. This antigen suitably diluted with suitable diluent such, for example, as physiological saline or a phosphate buffer solution is adapted for use in complement fixation or other serological procedures to determine the presence or absence of *Endamoeba histolytica*.

Preferably, incubation of *Endamoeba histolytica* in a nutrient medium is conducted in the presence of animal bacterial flora. Such bacterial flora may be added to the *Endamoeba histolytica* prior to its addition to the nutrient medium or may be separately added to the nutrient medium before or after addition of *Endamoeba histolytica*.

The co-presence of bacterial flora along with *Endamoeba histolytica* during incubation in the nutrient medium tends greatly to enhance proper growth of the *Endamoeba histolytica*. Mere incubation of isolated *Endamoeba histolytica* in a nutrient medium does not insure sufficient growth of proper character to provide *Endamoeba histolytica* capable of yielding antigen of suitable strength or type. Co-presence in the nutrient medium of bacterial flora, particularly intestinal bacterial flora is necessary to insure desirable growth of *Endamoeba histolytica* irrespective of the completeness of the nutritive composition of the medium in other respects. Bacterial flora, the co-presence of which insures growth of *Endamoeba histolytica* in nutrient media include particularly those isolated from the intestines of vertebrate animals, including man. However, when *Endamoeba histolytica* is grown for the purpose of recovering antigen suitable for diagnosis of amebiasis by serologic methods, employment of bacterial flora of the types normally associated with *Endamoeba histolytica* in man should be avoided, since such employment results in antigen tending to give false positive results. Thus, in general, bacterial flora isolated from warm-blooded animals, including man, are not suitable for use in production of antigen for serological diagnosis. However, bacterial flora isolated from the intestines of cold-blooded animals have been found suitable for employment in producing an antigen adapted for use in serological diagnosis of amebiasis in man. They not only stimulate satisfactory growth of *Endamoeba histolytica* in nutrient media but also provide antigen recovered from *Endamoeba histolytica* so grown which is suitable for diagnosis of amebiasis in man in that it has adequate antigenic titer, is non-hemolytic and non-anticomplementary and does not result in false positives from bacterial antigen reactions. Intestinal bacterial flora isolated from fish, amphibians and reptiles are suitable. Intestinal bacterial flora isolated from reptiles are preferred because these animals are the higher order of the cold-blooded animal vertebrates, thus more nearly approaching the order of man. For example, the larger marine reptiles are convenient sources of suitable intestinal bacterial flora.

Thus for production of antigen for serologic diagnosis of amebiasis in man, I prefer to grow *Endamoeba histolytica* by incubation in a nutrient medium in the presence of intestinal bacterial flora, isolated from reptilia, amphibia or pisces. To facilitate subsequent separation of the amoebae from the nutrient medium, I employ substantially liquid media. Use of solid or semi-solid media, as for example the slant method is undesirable because contamination from such media attendant on separating the amoebae therefrom tend to result in an anticomplementary antigen.

The constitution of the sterile nutrient solution may vary so long as animal or vegetable nutrient materials or extracts thereof are included, supplemented, if necessary, by a source of intermediate nitrogenous compounds and available carbohydrate. The constituents of the nutrient solution are preferably water-soluble, capable of solubilizing in water during incubation or in liquid form in order to facilitate subsequent separation of the incubated intact amoebae from the nutrient solution. Particularly suitable as sources of animal or vegetable nutrient materials are animal tissues or extracts thereof such as dehydrated beef heart, beef extract, mammalian liver and mammalian liver extracts, vegetable extracts such as a water extract of yeast and the like. A nutrient solution containing such natural nutrient materials together with available nitrogenous compounds and carbohydrate is hereinafter designated "complete nutrient solution."

As the source of supplementary available nitrogenous compounds, enzymatic protein hydrolysates may be used. As examples of the many such preparations commercially available, there are materials supplied by Difco Laboratories, Inc., such as "Bacto Proteose-Peptone," "Bacto Peptone," "Bacto Tryptone," "Bacto Tryptose," "Bacto Neopeptone," "Bacto Protone." Other intermediate nitrogenous compounds containing proteose, peptones, peptides or amino acids may be employed. Supplementary carbohydrate may be supplied in the form of starches. In many instances it may be desirable to include in the nutrient medium a sterol such, for example, as cholesterol, viosterol and ergosterol. Care should be taken to avoid addition, as a source of sterols, of natural sterol-containing materials such as egg yolk which tend to result in an anticomplementary antigen.

It is preferred to maintain the nutrient solution during propagation of the amoebae therein at a pH between about 6.5 and 7.5. This may be accomplished, for example, by addition of suitable buffer material. While buffers effective within the pH range 6.5 to 7.5 are desirable for purposes of this invention, I have found it preferable to maintain the pH within the smaller range of pH 6.8 to 7.4 by employment of suitable buffers.

The quantity of *Endamoeba histolytica* introduced into a given quantity of nutrient solution may vary from about 500 to 50,000 or more *Endamoeba histolytica* per ml. of nutrient solution. For particular nutrient solutions the proportion of introduced amoebae to nutrient solution which results in maximum growth of *Endamoeba histolytica* can readily be determined. As concentration of amoebae placed in the nutrient solution is increased beyond the optimum, the yield decreases due to inability of the nutrient solution to support optimum growth of the organisms in such high concentration. While the copresence with the *Endamoeba histolytica* in the nutrient solution of bacterial flora is of prime importance, the amount of such bacterial flora introduced is not of particular importance, so long as such bacterial flora is present in substantial amount. However, as before stated, when propagating *Endamoeba histolytica* for recovery of antigen for diagnosis of amebiasis in man by serological methods, bacterial flora of types normally associated in man with *Endamoeba histolytica* should not be present in substantial amount.

In producing antigen, care must be taken in separation or recovery of the amoebae from the nutrient solution that the amoebae are not ruptured or otherwise harmed. This may be accomplished for example by sedimentation or by centrifuging in a clinical centrifuge to collect from the liquid nutrient medium or nutrient solution as a supernatant the unruptured amoeba as useful sediment. This centrifugation should be accomplished at a relatively low speed so that the amoebae are forced to the bottom of the centrifuge bottle without any substantial tendency to rupture the cells. Separation of intact and motile amoebae is thus attained. I have found that a speed of about 2500 r.p.m. is suitable for this centrifugation. The rupture of the separated amoebae may be effected in any desired manner as, for example, by mashing or grinding. However, I prefer to effect rupture by freezing the amoebae to a suitably low temperature for a suitable period of time. I have found that freezing the amoebae and maintaining them at a temperature of about −5° C. to about −20° C., or lower, for approximately 10 to 24 hours insures rupture of substantially all of the amoebae. The ruptured amoebae are then thawed and the liquid antigen is separated from the cellular debris by centrifugation at high speeds.

In contrast to methods previously proposed, the methods of this invention involve the growth of *Endamoeba histolytica* together with suitable bacterial flora in an environmentally compatible nutrient medium. Previous efforts have been directed to attempts to grow *Endamoeba histolytica* in pure culture, in artificially infected animals, in inadequate synthetic media or in media foreign to the natural environment of the organism such as egg medium. I have found that the strength of the resulting antigen is proportional to the number of amoebae from which it is obtained and that the amoebae best grow under conditions approximating their normal environment. Consequently, my methods involve growth of amoebae in the presence of suitable bacterial flora in an environmentally compatible and adequate nutrient solution favorable to their growth and later separating the amoebae from such preferred environment rather than attempting to grow amoebae in the absence of compatible organisms or in synthetic or foreign media.

The methods herein described for recovery of antigen from the incubated amoebae have the further advantage that they result in substantial separation of the *Endamoeba histolytica* antigen from the bacterial flora which are co-present in the nutrient liquid or antigen of those bacterial flora. In the centrifugation or sedimentation in which the intact amoebae are recovered as the useful sediment the bacterial flora and antigens of the latter tend predominantly to remain in the supernatant nutrient liquid portion. Any bacterial flora remaining with the packed amoebae cells are substantially separated from the liquid antigen resulting from rupture of amoebae cells by the subsequent separation of the liquid antigen from the cellular debris. However, bacterial antigen produced by the bacterial flora isolated from cold-blooded vertebrate animals, if present in the recovered *Endamoeba histolytica* antigen, does not affect suitability of the recovered antigen for serological diagnosis of amebiasis in man.

The following example is given to illustrate a method of preparing a suitable antigen according to one embodiment of my invention and is not intended to place any restrictions or limitations on the invention herein described. For illustrative purposes, I have chosen an example in which the organism is incubated in 10 ml. of nutrient solution in a glass tube, but it will be understood that the volume of the preparation is not important. The same result may be obtained on any practical scale with observance of the proportions of ingredients given.

A nutrient solution is prepared consisting of 2 grams of liver fraction "L" (Nutritional Biochemicals), a buffer consisting of 2.09 grams of disodium phosphate and 1.6 grams of potassium acid phosphate, 3 grams of NaCl, 1.67 grams enzymatic protein hydrolysates (Bacto Proteose-Peptone), 100 mgm. of cholesterol, and distilled water to make 1 liter. 10 ml. of the nutrient solution is tubed and autoclaved at 15 p.s.i. for 15 minutes to effect sterilization of the nutrient solution. After autoclaving 20 mgm. of sterile rice starch is added. The nutrient medium is then aseptically inoculated with about 100,000 Endamoeba histolytica and 1 ml. of a suspension containing bacterial flora isolated from the intestinal tract of a turtle is added. The inoculated culture is then incubated for a period of 48 hours at 37° C. to effect growth of the amoebae. After the incubation period, the mixture is removed from the tube and centrifuged at 2500 r.p.m. in a clinical centrifuge, effecting separation of the amoebae. Care must be taken not to rupture or otherwise harm the amoebae. The supernatant is removed by siphoning and discarded. The settled concentrate of packed cells resulting from the above centrifugation is frozen, and maintained at a temperature of approximately −10° C. for 24 hours to effect rupture of the amoebae. The frozen concentrate is then thawed, and the resultant liquid is centrifuged at approximately 12,000 r.p.m. in an angle centrifuge until the supernatant is clear. The sediment is discarded and the remaining solution is the antigen. This antigen in aqueous solution is adapted for use as the test antigen in serological procedures to determine the presence of Endamoeba histolytica in animal bodies by serological methods.

In carrying out the above example, the separation steps may, if desired, be followed, of course, by washing. Thus, for example, after separation of the intact amoebae by centrifugation the packed cells may be washed with the saline buffer solution hereinafter described or with physiological saline solution and the centrifugation repeated to separate the intact amoebae from the wash solution. Similarly the cellular debris separated from the liquid antigen may be washed and the wash solution added to the recovered antigen.

Antigen to be employed for diagnosis of amebiasis according to the complement fixation procedure should first be standardized. Standardization may be accomplished as follows. A buffered saline stock solution is prepared by dissolving NaCl—17.00 grams, $Na_2HPO_4$—1.13 grams and $KH_2PO_4$—0.27 grams in distilled water to make 100.0 ml. and diluting 1/20 with sterile distilled water. Defibrinated or citrated sheep blood cells are centrifuged at 2500 r.p.m. for 10 minutes three times or until the supernatant is clear. A 5% suspension of the settled cells is made which contains about 1,000,000 cells per $mm.^3$ as determined by actual count or spectrophotometrically. The sheep-cell hemolysin system is standardized to determine optimal dilution as in the Kolmer method for serologic tests for syphilis except that the above described buffered saline stock solution is used as the diluent and 0.2 ml. of 5% sheep cells is used rather than 0.5 ml. of 2% sheep cells as in the Kolmer method. Hemolysin in its thus determined optimal dilution is employed in making the necessary sensitized sheep cell suspension as required by admixing the hemolysin solution with sheep cell suspension in equal volumes. Similarly, complement is standardized in serial dilution against the sensitized sheep cell suspension and a solution of complement containing two full units (optimal dilution) is prepared. Serial dilutions of the antigen from 1/10 to 1/640 in .5 ml. quantites are set up in a series of tubes and to each serial dilution there is added 0.1 ml. of known Endamoeba histolytica positive serum, which has been inactivated at 56° C. for 30 minutes, and 2 full units of complement. Sufficient buffered saline stock solution is added to each tube to make 1.6 ml. and the tubes are incubated for 1 hour at 37° C. 0.4 ml. of the sensitized sheep cell suspension is then added to each tube and the tubes are incubated at 37° C. for 30 minutes. The antigenic unit is the highest dilution showing complete fixation of the complement, i.e. no hemolysis. "Optimal dilution" of the antigen is that dilution which will give 2 full antigenic units. The antigen prepared according to this invention upon standardization may be diluted with the buffered saline stock solution to the thus determined optimal dilution. Anticomplementary and hemolytic controls may be run. Absence of anticomplementary effect of the antigen may be demonstrated by setting up a duplicate standardization test omitting the positive serum.

A qualitative test for the diagnosis of amebiasis according to complement fixation procedures may be performed as follows. To 0.2 ml. of serum obtained from the subject to be tested and inactivated at 56° C. for 30 minutes, there is added 0.5 ml. of the optimal dilution of the antigen and 2 full units of complement. A sufficient amount of the buffered saline stock solution, prepared as described above, is added to make 1.6 ml. The mixture is incubated for 1 hour at 37° C., and then 0.4 ml. of sensitized sheep cell suspension, preparation of which is described above, is added. The mixture is then further incubated for 30 minutes at 37° C. A positive test is indicated by complete fixation of the complement, i.e. no hemolysis. A negative test is indicated by no fixation of the complement, i.e. complete hemolysis. Anticomplementary and hemolytic controls should be run on the serum to insure reliability of the results.

It should be understood that the complement fixation procedure described above is given by way of example of one mode of employing the antigen of this invention. The antigen may, of course, be employed in a number of ways. Among others the antigen may be employed in other serological procedures for detection of the presence of Endamoeba histolytica, as for example in the sedimentation or flocculation procedures.

When using complement-fixation procedures, the antigen of the present invention produces positive diagnostic results with dilutions as high as 1:320, and when using a 4+ poled serum which, it will be understood, is obtained from persons having heavy active amebic infection. When the antigen of this invention is used according to flocculation procedures, as in the precipitin test, the antigen produces positive diagnostic reactions with antigen dilutions as high as 1:100, on 4+ serum. Below a dilution of 1:10 the antigen may give false positive reactions on negative sera in the precipitin test and above a dilution of 1:100 no reaction is observed with 4+ sera. The optimal dilution for precipitin, or flocculation, procedures is a dilution of approximately 1:30. It is possible to use this antigen for other serological procedures wherein the dilution permitted would be substantial and of the order of those procedures described above.

It may be noted that optimal dilution is that ratio of dilution of antigen with diluent which when added to a determined volume of a given serum gives the most rapid flocculation or precipitation. (See Experimental Immuno-chemistry, Kabat and Mayer, 1st ed. pp. 12–13; 1948.) The antigen of this invention, in the complement fixation test, has an optimal dilution of about 1:80 to 1:100 and has an antigenic titer of at least 1:100 for complement fixation.

The unique antigen of the present invention is thus prepared by a procedure comprising propagating Endamoeba histolytica in the presence of intestinal bacterial flora of cold-blooded vertebrate animals in a liquid culture medium which is environmentally compatible to growth of Endamoeba histolytica. The liquid culture medium comprises water, a material selected from the group consisting of water-soluble extracts of animal and vegetable tissues, a source of available nitrogen and a source of available carbohydrate, and is substantially free from any intestinal bacterial flora of warm-blooded vertebrate animals to assure absence of anti-complementary and hemolytic factors. The presence in the liquid culture medium of intestinal bacterial flora of cold-blooded vertebrate animals preferably is attained by the addition thereof to the liquid culture medium at about the time the latter is aseptically inoculated with the *Endamoeba histolytica*.

It will thus be seen that the objects set forth above, among those made apparent from the preceding description are efficiently attained and, since certain changes may be made in carrying out the above process and in the above product without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The process of preparing an antigen for diagnosis of amebiasis by serological methods which comprises propagating *Endamoeba histolytica* in a liquid culture medium which is environmentally compatible to the growth of *Endamoeba histolytica*, said culture medium containing intestinal bacterial flora obtained from the intestinal tract of cold-blooded vertebrate animals and being substantially free of intestinal bacterial flora obtained from warm-blooded vertebrate animals to assure absence of anticomplementary and hemolytic factors, said culture medium additionally comprising water, a material selected from the group consisting of water-soluble extracts of vegetable and mammalian animal tissues, a source of available nitrogen and a source of available carbohydrate; physically separating intact motile *Endamoeba histolytica* from said liquid culture medium by collecting from culture supernatant the amoebae without rupture; physically rupturing the separated intact amoebae by application of physical force thereto sufficient to break the walls of the amoebae cells for release of contained antigen liquid; and recovering by physical separation the resulting antigen solution from the ruptured cells.

2. The antigen produced by the practice of the process defined in claim 1.

3. The process as defined in claim 1 characterized by said liquid culture medium including a buffer for maintaining pH at a level between about 6.8 and 7.4, an enzymatic protein hydrolysate as a source of available nitrogen, and an egg protein-free sterol.

4. The process as defined in claim 1 characterized by said liquid culture medium including a buffer for maintaining pH at a level between about 6.8 and 7.4, protein hydrolysate, an egg protein-free sterol, and rice starch.

5. The process of preparing an antigen for diagnosis of amebiasis by serological methods which comprises propagating *Endamoeba histolytica* in a liquid culture medium which is environmentally compatible to the growth of *Endamoeba histolytica,* said culture medium containing intestinal bacterial flora obtained from the intestinal tract of amphibia and being substantially free of intestinal bacterial flora obtained from warm-blooded vertebrate animals to assure absence of anticomplementary and hemolytic factors, said culture medium additionally comprising water, a material selected from the group consisting of water-soluble extracts of vegetable and mammalian animal tissues, a source of available nitrogen and a source of available carbohydrate; physically separating intact motile *Endamoeba histolytica* from said liquid culture medium by collecting from culture supernatant the amoebae without rupture; physically rupturing the separated intact amoebae by application of physical force thereto sufficient to break the walls of the amoebae cells for release of contained antigen liquid; and recovering by physical separation the resulting antigen solution from the ruptured cells.

6. The process of preparing an antigen for diagnosis of amebiasis by serological methods which comprises propagating *Endamoeba histolytica* in a liquid culture medium which is environmentally compatible to the growth of *Endamoeba histolytica,* said culture medium containing intestinal bacterial flora obtained from the intestinal tract of cold-blooded vertebrate animals and being substantially free of intenstinal bacterial flora obtained from warm-blooded vertebrate animals to assure absence of anticomplementary and hemolytic factors, said culture medium additionally comprising water, a material selected from the group consisting of water-soluble extracts of vegetable and mammalian animal tissues, a source of available nitrogen and a source of available carbohydrate; maintaining the pH of said culture medium during said propagation to between 6.5 and 7.5 by addition of a buffer; physically separating intact motile *Endamoeba histolytica* cells from said buffered culture solution by collecting from culture supernatant the amoebae cells without rupture; maintaining the separated amoebae at a temperature below about −5° C. to effect rupture of the amoebae cells; thawing the frozen amoebae; and physically separating from the cellular sediment the antigen liquid freed from the ruptured cells.

7. In a process of preparing an antigen for diagnosis of amebiasis by serological methods wherein propagation of *Endamoeba histolytica* is effected in a liquid nutrient culture medium inoculated therewith and which is environmentally compatible to growth of *Endamoeba histolytica,* the steps which comprise maintaining said inoculated liquid medium during said propagation substantially free from intestinal bacterial flora of warm-blooded vertebrate animals, incorporating in said liquid culture medium prior to said propagation intestinal bacterial flora of cold-blooded vertebrate animals isolated from such of the intestinal tracts of cold-blooded animals as are substantially free from intestinal bacterial flora of warm-blooded vertebrate animals, physically separating intact motile *Endamoeba histolytica* from said liquid culture medium by collecting unruptured *Endamoeba hystolytica* therefrom, physically rupturing the intact *Endamoeba hystolytica* by application thereto of physical force sufficient to break the walls of the *Endamoeba hystolytica* cells for release of contained antigen liquid, and recovering by physical separation the resulting antigen liquid from the ruptured cells and debris.

8. In a process of preparing an antigen for diagnosis of amebiasis by serological methods wherein propagation of *Endamoeba histolytica* is effected in a nutrient culture medium the steps which comprise providing said medium in liquid form, incorporating in the said liquid medium prior to said propagation intestinal bacterial flora obtained from the intestinal tracts of cold-blooded vertebrate animals, maintaining said culture medium substantially free from intestinal bacterial flora obtained from warm-blooded vertebrate animals, physically separating intact *Endamoeba histolytica* from said culture medium by collecting unruptured *Endamoeba histolytica* therefrom, physically rupturing said collected *Endamoeba histolytica* and recovering by physical separation the resulting antigen liquid from the ruptured cells and debris.

9. In a process of preparing an antigen for diagnosis of amebiasis by serological methods wherein propagation of *Endamoeba histolytica* is effected in a nutrient culture medium the steps which comprise providing said medium in liquid form, incorporating in the said liquid medium prior to said propagation intestinal bacterial flora obtained from the intestinal tracts of amphibia, maintaining said culture medium substantially free from intestinal bacterial flora obtained from warm-blooded vertebrate animals, physically separating intact *Endamoeba histolytica* from said culture medium by collecting unruptured *Endamoeba histolytica* therefrom, physically rupturing said collected *Endamoeba histolytica* and recovering by physical separation the resulting antigen liquid from the ruptured cells and debris.

References Cited in the file of this patent

UNITED STATES PATENTS

| | | |
|---|---|---|
| 2,469,456 | Dulaney | May 10, 1949 |
| 2,598,659 | De Boer | June 3, 1952 |

OTHER REFERENCES

Chang: Proc. 4th Int. Cong. on Trop. Med. and Malaria, 1948, pp. 1065–1074.

Everitt: J. Parasitology, December 1950, pp. 586–587, and 594.

Balamuth et al.: The Am. J. of Trop. Med., March 1951, pp. 202–204.

Heathman: Biol. Abst., March 1933, pp. 642–643.

Nelson: J. of Trop. Med., 1947, pp. 545–552.

Todd et al.: Clinical Diagnosis by Lab. Methods, 1941, 9th ed., Saunders, pp. 478–479.

Wadsworth: Standard Methods, Williams and Wilkins, Balt. Md., 1947, 3rd ed., pp. 97 and 217.

Zabell: Marine Microbiology, Pub. 1946, Chronica Botanica Co., Waltham, Mass., pp. 188–190.

Saito: Kitasato Arch of Exp. Med., July 1950, pp. 33–36.